United States Patent [19]

Wollermann

[11] Patent Number: 4,632,613
[45] Date of Patent: Dec. 30, 1986

[54] SPINDLE TOOL RETENTION AND EJECTION MECHANISM

[76] Inventor: Kenneth A. Wollermann, 8400 Northwest Hwy., Mukwonago, Wis. 53149

[21] Appl. No.: 769,393

[22] Filed: Aug. 26, 1985

[51] Int. Cl.[4] .......................... B23B 31/06; B23B 31/26
[52] U.S. Cl. .................................. 409/233; 279/1 E; 279/82; 279/89
[58] Field of Search ............. 279/1 E, 89, 1 B, 1 ME, 279/1 TS, 76, 81, 82, 90, 91; 409/231–234

[56] References Cited

U.S. PATENT DOCUMENTS

| | | | |
|---|---|---|---|
| 3,622,169 | 11/1971 | Koch et al. | 279/89 X |
| 3,658,352 | 4/1972 | Koch et al. | 279/89 |
| 3,741,573 | 6/1973 | Treer | 279/81 |
| 4,347,753 | 9/1982 | Claussen et al. | 279/4 X |

*Primary Examiner*—Gil Weidenfeld
*Assistant Examiner*—Steven C. Bishop
*Attorney, Agent, or Firm*—Quarles & Brady

[57] ABSTRACT

A mechanism for retaining tools in the spindle of a machine tool and for ejecting the tools for removal from the spindle. The mechanism is adapted to operate with standard cutting tool holders having a retention knob extending rearwardly and axially. The tool holder is retained in the spindle by a set of locking pins that extend radially through the spindle in a single plane in position to engage the inner side of the knob. A set of release pins of similar construction extend radially through the spindle in another plane in position to engage the outer side of the knob for ejecting the tool holder from its seat in the spindle. A cylindrical cam is slidably disposed about the spindle for axial movement by pneumatic or hydraulic pressure. When the cylindrical cam is moved in one direction it actuates the locking pins inwardly into locking engagement with the retention knob on the tool holders. A shifting of the cylindrical cam in the opposite direction serves to release the locking pins and actuate the release pins to force them inwardly for engaging the retention knob on its outer side to eject the tool holder and its associated cutter from the spindle.

10 Claims, 4 Drawing Figures

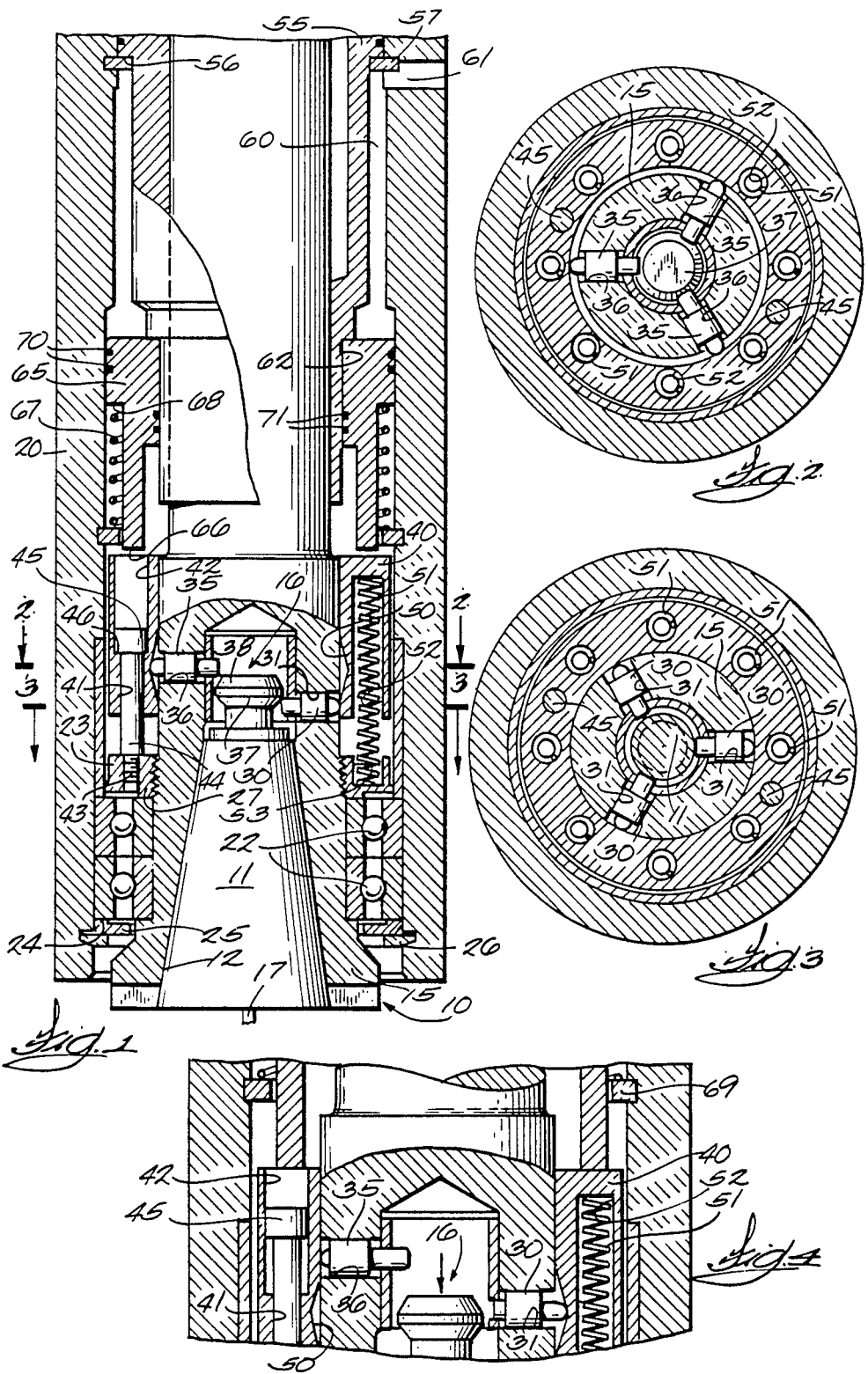

SPINDLE TOOL RETENTION AND EJECTION MECHANISM

BACKGROUND OF THE INVENTION

The invention pertains to mechanisms for retaining and ejecting standard tool holders in machine tool spindles.

The present invention is especially adapted to operate with conventional tool holders that have been adopted by the American National Standard Institute as the standard tool holder for use in automatic machine tools as specified in ANSI standard B5, TC45. Such tool holders are provided with a tapered shank for reception in a complementary tapered opening in the end of the machine tool spindle. The large end of the taper is adapted to receive a cutting tool for operation on a workpiece while a retention knob extends axially from the small or rear end of the tool holder.

A variety of mechanisms have been designed for cooperating with such retention knob to retain the tool holder in the spindle. For example, the structure shown in U.S. Pat. No. 4,347,753 discloses a collet mounted on the end of a draw bar in position to encompass the knob on the end of the tool. The collet is clamped inwardly to lock the knob to the collet while drawing the tool holder into the spindle. The power for locking the collet and drawing the tool holder tightly into the spindle opening is a stack of Belleville springs disposed within the spindle. The collet is unclamped by hydraulic power which compresses the Belleville springs to release the collet.

However, the prior art retention systems require relatively complex mechanisms mounted within the spindle and necessitate the boring of an axial hole through the spindle as well as other difficult machining operations. The present invention eliminates the requirement for a central bore through the entire spindle and performs the function of locking the tool holder to the spindle without the conventional draw bar that passes through the center of the spindle. Instead, the retention and ejection mechanism of the present invention is disposed about the exterior of the spindle but within the quill of a spindle and quill assembly.

The improved retention and ejection mechanism of the present invention enables the spindle to be of solid construction for more efficient and stable operation. The entire assembly is very compact and occupies the small space between the spindle and the quill when the spindle is journaled in a quill. Accordingly, very little extra room is required in the spindle head which supports the spindle. Moreover, because of its unique arrangement, the mechanism exerts a minimum amount of force on the spindle bearings during its operation to reduce the amount of maintenance required on the entire spindle assembly while increasing its life.

Another advantage of the present invention lies in the fact that since the unit does not extend through a central bore in the spindle there is no operating structure at the rear end of the spindle. This permits the entire spindle head to be of minimum size while enabling it to be of a neat and streamlined design for enhancing the appearance of the machine.

Moreover, the arrangement is such, that the force repeated on the retention knob for drawing the tool holder into the spindle and retaining it in the spindle is always concentric with the retention knob even when the latter may be out of concentricity with the tool holder and therefore with the spindle.

SUMMARY OF THE INVENTION

The improved tool retention and ejection mechanism of the present invention is especially adapted for operation with the standard tool holders employed in automatic machine tools. Such tool holders have a tapered shank for reception in a complementary opening or socket in the end of the machine tool spindle. They are provided with an axially and rearwardy extending retention knob. The retention mechanism of the present invention includes a set of locking pins extending radially through the spindle. The several pins of the set are slidably supported by the spindle and are in the same plane so that when they are forced inwardly toward the axis of the spindle they engage the inner surface of the retention knob on the tool holder to draw the entire tool holder inwardly into the opening of the spindle.

A set of release pins, similar in construction to the locking pins, are also slidable radially through the spindle. The release pins are likewise disposed in a single plane but the plane is displaced along the axis of the spindle from the plane containing the locking pins. The release pins are disposed so that when they are forced inwardly, toward the axis of the spindle, they engage the outer side of the retention knob, to urge the tool holder outwardly of the socket in the spindle for ejecting the tool holder.

The locking pins and the release pins are actuated by a cylindrical cam that encircles the spindle and is slidable in an axial direction along the periphery of the spindle. The cylindrical cam is biased by a plurality of springs in a direction to engage the locking pins on their inner sides and force them inwardly toward the spindle axis into engagement with the retention knob on the tool holder for drawing the latter into the opening in the spindle and locking it therein for the performance of a machining operation. On the other hand, shifting of the cam in the opposite direction by pneumatic or hydraulic power against the pressure of the springs serves to release the locking pins for movement out of engagement with the retention knob and to engage the release pins for moving them inwardly toward the spindle axis and into engagement with the outer side of the retention knob to urge the tool holder outwardly for ejecting it from the spindle. The cylindrical cam is adapted to float relative to the spindle so that as it applies a force to the pins it is shifted by the pins into alignment with the retention knob so that the force applied to the retention knob is concentric with the knob even though the latter may be out of concentricity with the spindle.

The foregoing and other objects of this invention, which will become more fully apparent from the following detailed description may be achieved by means of the exemplifying apparatus depicted in and set forth in this specification in connection with the accompanying drawings.

BRIEF DESCRIPTION OF THE DRAWINGS

FIG. 1 is a cross-sectional view taken through the center of a machine tool spindle assembly incorporating the features of the present invention;

FIG. 2 is a sectional view taken along the plane represented by the line 2—2 in FIG. 1;

FIG. 3 is a sectional view taken along the plane represented by the line 3—3 in FIG. 1; and FIG. 4 is a fragmentary detailed cross-sectional view illustrating the retention knob of a tool holder as it is being ejected from the spindle.

Reference is now made more particularly to the drawing and specifically to FIG. 1 thereof which illustrates a spindle assembly of the type that may be employed in a machining center equipped with a tool change mechanism for exchanging tools generally identified herein by the reference numeral 10. The tool 10 generally comprises a tapered shank 11 adapted for reception in a complementary tapered opening or socket 12 formed in the end of a spindle 15. The tool 10 includes a retention knob 16 extending axially from the smaller end of the shank 11 for cooperation with suitable mechanism in the spindle 15 for retaining the tool 10 in the socket 12 as well as for ejecting it therefrom. The opposite end of the tool 10 is provided with a cutter 17 which rotates with the spindle 15 for operation on the workpiece.

The spindle 15 is shown as being journaled in a quill 20 that is slidably mounted in a spindle head (not shown). The quill 20 is slidably supported in the spindle head for axial movement in a well known manner to produce an axial movement of the spindle 15 and its associated tool 10 toward and away from the workpiece that is being operated upon.

The spindle 15 is rotatably supported within the quill 20 by a pair of anti-friction bearings 22 at its forward end and an appropriate bearing (not shown) is provided at the opposite end for rotatably supporting the spindle 15 within the quill 20. A bearing nut 23 is in threaded engagement with suitable threads formed on the spindle 15 for retaining the bearings 22 in position. The outer race of the forward most bearing 22 engages a lip 24 formed on a flat spacer 25 that abuts an annular split ring 26 disposed within a suitable annular groove formed in the quill 20. The nut 23 is provided with an inner lip 27 that bears against the inner race of one of the second bearing 22. Therefore, since the outer race of one of the bearings 22 abuts the lip 24 and the inner race of the bearings is abutted by the lip 27, the preload on the bearings can be adjusted by tightening the nut 23.

The locking of the tool 10 in the spindle 15 is performed by three locking pins 30 that are slidably disposed in holes 31 that extend radially in equal spaced relationship about the spindle 15. The three locking pins 30 are disposed in a single plane that extends transversely of the spindle axis as clearly shown in FIG. 3. In like manner, three release pins 35 are slidably disposed in holes 36 that extend radially through the spindle 15 in equally spaced relationship about a spindle. The release pins 35 are disposed in a plane that is also transverse to the axis of the spindle but is displaced from the plane of the locking pins 30.

As clearly shown in FIG. 1, the retention knob 16 is of circular configuration with its inner annular surface being tapered downwardly to form a frusto cone 37 while the upper portion of the knob 16 is tapered upwardly to form a frusto cone 38. The locking pins 30 are located in position so that when the tool 10 is fully seated in the tapered opening 12 of the spindle, inward movement of the locking pins 30 will engage the annular tapered surface 37 of the knob 16 and exert a strong upward force on the tool 10 for drawing it tightly into the socket 12 and locking it in that position. On the other hand, the release pins 35 are located in a plane so that when they are urged inwardly they engage the annular tapered surface 38 of the knob 16 to apply a force for ejecting the tool 10 from the spindle socket 12.

The locking pins 30 and release pins 35 are actuated in their locking and releasing operations respectively by a cam ring 40 which is of cylindrical configuration and encircles the spindle as shown in FIG. 1. The cam ring 40 is mounted about the spindle 15 for axial slidable movement relative to the spindle. It is permitted to float relative to the spindle so that as it applies pressure to the pins the latter adjust the alignment of the cam ring 40 so that it is concentric with the retention knob 16. Therefore the force applied to the retention knob 16 by the locking pins 30 for drawing the tool 10 into the spindle and locking it there will always be concentric with the retention knob 16 even though the latter may be out of concentricity with the tapered shank 11 and therefore with the spindle 15 as is usually the case. The cam ring 40 includes two diametrically opposed stepped bores comprising a reduced diameter bore 41 and a coaxial large diameter bore 42.

The bearing nut 23 includes two threaded openings 43 for receiving the threaded ends of studs 44. The studs 44 pass through the reduced diameter bores 41 of the bearing ring 40 and are provided with a flange 45 at the upper end which is disposed in the large bores 42. The enlarged bore 42 forms a shoulder 46 with the reduced diameter bore 41 and this shoulder 46 is engaged by the flange 45 for limiting the upward movement of the cam ring 40.

The cam ring 40 includes an annular notch 50 of triangular cross-section along its inner surface for cooperating with the locking pins 30 and the release pin 35. Thus, when the cam ring 40 is in its upper limits of travel as illustrated in FIG. 1, the notch 50 is in alignment with the release pins 35. These pins can therefore enter the notch for moving out of engagement with the annular surface 38. However, when this happens, the ends of the locking pins 30 are engaged by the inner diameter of the cam ring 40 to force the pins inwardly into engagement with the annular tapered surface 37 for drawing the tool 10 tightly into the opening 12 of the spindle and locking it therein.

On the other hand, when the cam ring 40 is moved downwardly to its lower limits of travel, as shown in FIG. 4, the space formed by the notch moves into alignment with the locking pins 30 so that the latter can move into the notch 50 for releasing the knob 16 of the tool 10. However, the inner diameter of the cam ring 40 then engages the ends of the release pins 35 to force them inwardly, toward the axis of the spindle 15, for engaging the annular tapered surface 38 of the knob 16 to apply a pressure on the knob 16 for forcing the tool 10 out of the tapered opening 12 of the spindle for ejecting the tool.

The cam ring 40 is biased to its upper limits of movement by a plurality of compression springs 51 that are disposed in blind bores 52 formed in the wall of the cam ring 40. The bores 52 extend longitudinally parallel to the axis of the cam ring 40 and are spaced along the annular cam ring 40. Complementary blind bores 53 are formed in the wall of the bearing nut 23 for receiving and seating the end of the springs 51 that extend outwardly of the bores 52.

The cam ring 40 is actuated in the opposite direction for releasing the tool 10 from the spindle 40 by pneumatic or hydraulic power. To this end, an actuator sleeve 55 of stepped diameter is disposed in the annular space between the spindle 15 and the quill 20. The sleeve 55 includes an annular shoulder 56 for engagement with a split ring 57 for retaining the sleeve in position as shown in FIG. 1. The upper end of the sleeve 55 has an outer diameter that is smaller than the inner diameter of the quill 20 to form an annular passage 60 which is in communication with a port 61 formed in the wall of the quill 20.

The lower end of the sleeve 55 is of reduced inner diameter that encircles but does not contact the spindle 15 and also has a reduced outer diameter that cooperates with the inner wall of the quill 20 for forming an annular cylinder 62 that operatively receives an annular piston 65. Therefore, fluid pressure entering the passage 60 from the port 61 will act on the end of the piston 65 for forcing it downwardly, as viewed in FIG. 1, causing its end 66 to abut the end of the cam ring 40 to force the latter against the pressure of the springs 51 to shift the cam ring 40 to the position illustrated in FIG. 4.

When the fluid pressure in the passage 60 is relieved, the piston 65 is returned to its normal position, as shown in FIG. 1, by a coil spring 67 that is disposed in an annular space formed by a reduced diameter portion of the piston 65 and the inner wall of the quill 20. The spring 65 is seated at one end against a shoulder 68 formed by the reduced diameter portion of the piston, and is seated at its opposite end on a split ring 69 that is disposed within an annular groove formed in the inner wall of the quill 20. Suitable O-rings 70 are provided in the outer wall of the piston 65 while O-rings 71 are provided at the inner diameter of the piston 65 of preventing the leakage of fluid.

It is therefore apparent that the springs 51 serve to retain the cam ring 40 in its upper limits of travel for actuating the locking pins 30 to retain a tool 10 in the opening 12 of the spindle 15. When it is desired to release the tool, fluid pressure is admitted into the passage 60 for actuating the piston 65 to force the cam ring 40 downwardly to the position shown in FIG. 4 for releasing and ejecting the tool 10 from the tapered opening 12 of the spindle 15. When the pneumatic or hydraulic pressure in the passage 60 is relieved, the spring 67 returns the piston 65 to its normal position, and this in turn, permits the cam ring 40 to return to its normal position as shown in FIG. 1, by the action of the springs 51.

From the foregoing detailed description of the illustrative embodiment set forth herein to exemplify the present invention, it will be apparent that there has been provided an improved tool retention and ejection mechanism adapted for use in the spindle of the machine tool which is conveniently assembled in the annular space between the spindle and its supporting quill. The improved retention and ejection mechanism of the present invention is of simple construction but very efficient in operation.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention as defined in the subjoined claims.

I claim:

1. A tool retention and ejection mechanism for a spindle having an axial socket for receiving a tool that is provided with a rearwardly extending retention knob; a plurality of locking pins spaced about the spindle in a plane that is transverse to the axis of the spindle and slidable radially relative to the spindle in position to be moved into engagement with the retention knob for retaining the tool tightly in the socket of the spindle; a cylindrical cam encircling the periphery of the spindle while floating relative thereto and slidable therealong to engage said locking pins and shift them toward the axis of the spindle for engaging the retention knob to draw its associated tool into the socket of the spindle and lock it therein; and means for actuating said cylindrical cam.

2. A tool retention and ejection mechanism according to claim 1 including a plurality of release pins slidable radially relative to the spindle and disposed in a plane that is transverse to the axis of the spindle but displaced from the plane containing said locking pins, and means on said cylindrical cam in position to shift said release pins into engagement with said retention knob for ejecting the tool from the socket of the spindle.

3. A tool retention and ejection mechanism according to claim 2 wherein said locking pins are moved by said cam into engagement with an annular tapered locking surface formed on the retention knob for locking the tool in the socket of the spindle; and said release pins are moved by said cam into engagement with an annular tapered ejection surface formed on the retention knob for ejecting the tool from the socket of the spindle.

4. A tool retention and ejection mechanism according to claim 1 wherein said means for actuating said cylindrical cam are a plurality of springs disposed to bias said cam in a direction for moving said locking pins into locking engagement with said retention knob; and including a piston and cylinder mechanism operable to shift said cam in a direction against the force of said springs for releasing said locking pins.

5. A tool retention and ejection mechanism according to claim 3 wherein said means for actuating said cylindrical cam is a plurality of springs biasing said cam along the spindle in a direction for moving said locking pins into locking engagement with the locking surface on the retention knob for securing the tool in the spindle socket; and including a piston and cylinder mechanism operable to shift said cam in a direction against the force of said springs to release said locking pins and engage said release pins for moving the latter into engagement with the ejection surface on the retention knob for ejecting the tool from the socket of the spindle.

6. A tool retention and ejection mechanism for a spindle having an axial socket for receiving a tool that is provided with a rearwardly extending retention knob presenting a locking surface and an ejection surface; at least one locking pin slidable radially relative to the spindle in position to be moved into engagement with said locking surface for retaining the tool tightly in the socket of the spindle; at least one release pin slidable radially relative to the spindle in position to engage said ejection surface for ejecting the tool from the spindle; a cylindrical cam slidable coaxially about the periphery of the spindle for engaging alternatively either said locking pin into engagement with said locking surface for retaining the tool in the spindle or in a direction for releasing said locking pin for movement out of engagement with said locking surface and into position for moving said release pin into engagement with said ejection surface for ejecting the release tool out of said spindle; spring means disposed to bias said cylindrical cam in a direction for moving said locking pin into engagement with said locking surface on the retention knob; and including an annular piston and cylinder mechanism coaxially disposed about the periphery of the spindle adjacent to said cylindrical cam; and means connected to actuate said piston and cylinder mechanism for actuating said cylindrical cam to release said locking pin and actuate said release pin for ejecting the tool from the spindle.

7. A tool retention and ejection mechanism according to claim 6 wherein said cylindrical cam floats relative to the spindle so that it will be shifted into alignment with the retention knob by said locking pins so that the force applied to the retention knob will always be concentric therewith even though the knob may be out of concentricity with the spindle.

8. A tool retention mechanism according to claim 6 wherein there are a plurality of said locking pins spaced about said spindle in a plane that is transverse to the axis of the spindle; and including a plurality of release pins spaced about the spindle in a plane that is transverse to the axis of the spindle but displaced from the plane containing said locking pins.

9. A tool retention and ejection mechanism for a spindle having an axial socket for receiving a tool; a locking surface associated with said tool; an ejection surface associated with said tool; at least one locking pin slidably radially through the spindle in position to be moved into engagement with said locking surface for retaining the tightly in the socket of the spindle; at least one release pin slidable radially through the spindle in position to be moved into engagement with said ejection surface for ejecting the released tool from the socket of the spindle; a cylindrical cam slidable axially along the periphery of the spindle and presenting a cam surface for actuating said locking pin into engagement with said locking surface and for releasing said locking pin while actuating said release pin into engagement with said ejection surface, said cylindrical cam being permitted to float relative to the spindle so that it will be shifted into alignment with said locking and ejection surfaces so that the forces applied thereto will always be concentric therewith even through such surfaces may be out of concentricity with the spindle; biasing means disposed to bias said cylindrical cam to its normal position for retaining said locking pins in engagement with said locking surface; and shifting means actuatable to shift said cylindrical cam out of its normal position for releasing said locking pins and actuating said release pins into engagement with said ejection surface for ejecting the tool out of the socket of the spindle.

10. A tool retention and ejection mechanism according to claim 9 including a rearwardly extending retention knob with said locking surface being formed on one side of said retention knob and said ejection surface being formed on the opposite side of said retention knob; and wherein said shifting means comprises an annular piston and cylinder mechanism about the periphery of said spindle and concentric with said cylindrical cam actuatable from an idle position to shift said cylindrical cam for releasing said locking pin and actuating said release pin, means connected to actaute said piston and cylinder mechanism from its idle position for shifting said cylindrical cam, and biasing means for returning said piston and cylinder mechanism to its idle position.

* * * * *